US008475912B2

(12) United States Patent
Seong et al.

(10) Patent No.: US 8,475,912 B2
(45) Date of Patent: Jul. 2, 2013

(54) COATING COMPOSITION FOR FORMING LOW-REFRACTIVE-INDEX LAYER, ANTIREFLECTIVE FILM USING THE SAME, AND IMAGE DISPLAY DEVICE INCLUDING THE ANTIREFLECTIVE FILM

(75) Inventors: Yun Jeong Seong, Seoul (KR); Kyoung Ku Kang, Nonsan-si (KR); Hyoung Tae Lim, Uiwang-si (KR); Young Cheol Lee, Suwon-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 852 days.

(21) Appl. No.: 12/385,688

(22) Filed: Apr. 16, 2009

(65) Prior Publication Data
US 2009/0202802 A1 Aug. 13, 2009

Related U.S. Application Data (63) Continuation of application No. PCT/KR2006/005615, filed on Dec. 21, 2006.

(30) Foreign Application Priority Data

Oct. 16, 2006 (KR) ......................... 10-2006-0100262
Nov. 6, 2006 (KR) ......................... 10-2006-0108903

(51) Int. Cl.
*G02B 1/11* (2006.01)
*B32B 7/02* (2006.01)
*C08F 14/18* (2006.01)
*C08G 77/22* (2006.01)

(52) U.S. Cl.
USPC ........... 428/212; 526/242; 526/252; 525/479; 528/30; 428/220; 359/580

(58) Field of Classification Search
None
See application file for complete search history.

(56) References Cited

U.S. PATENT DOCUMENTS

| 4,786,658 A | 11/1988 | Hashimoto et al. |
| 4,884,866 A * | 12/1989 | Hashimoto et al. ........... 385/145 |
| 4,940,602 A | 7/1990 | Taniguchi et al. |
| 6,873,387 B2 | 3/2005 | Hokazono et al. |
| 7,022,401 B2 | 4/2006 | Obayashi et al. |
| 2003/0109626 A1* | 6/2003 | Bradley et al. ................ 524/502 |
| 2007/0139780 A1 | 6/2007 | Suzuki et al. |
| 2008/0138606 A1* | 6/2008 | Yoshihara et al. ............ 428/327 |

FOREIGN PATENT DOCUMENTS

| JP | 62-250047 A | 10/1987 |
| JP | 63-021601 A | 1/1988 |
| JP | 64-001527 A | 1/1989 |
| JP | 06-240206 A | 8/1994 |

(Continued)

OTHER PUBLICATIONS

Machine translation of JP 2006-028409. Retrieved Aug. 19, 2011.*

*Primary Examiner* — Maria Veronica Ewald
*Assistant Examiner* — Prashant J Khatri
(74) *Attorney, Agent, or Firm* — Lee & Morse, P.C.

(57) ABSTRACT

A coating composition for forming a low-refractive-index layer includes a first fluorine compound represented by Formula 1 below, $$(CH_2{=}CR^1COO)_2R^f \quad \text{Formula 1}$$

and a reactive silicon compound, a (meth)acrylate compound, a polymerization initiator, and a solvent. The first fluorine compound represented by Formula 1, the reactive silicon compound, the (meth)acrylate compound, the polymerization initiator, and the solvent may each be different from one another, and in Formula 1, $R^f$ may be a $C_{1-19}$ perfluoro group, and $R^1$ may be a hydrogen atom or a methyl group.

15 Claims, 4 Drawing Sheets

FOREIGN PATENT DOCUMENTS

| | | |
|---|---|---|
| JP | 07-126552 A | 5/1995 |
| JP | 08-239430 A | 9/1996 |
| JP | 11-002702 A | 1/1999 |
| JP | 2000-159840 A | 8/2000 |
| JP | 2001-318207 A | 11/2001 |
| JP | 2002-003550 A | 1/2002 |
| JP | 2004-045462 A | 2/2004 |
| JP | 2006-028409 A | 2/2006 |
| KR | 10-2005-0118911 A | 12/2005 |
| KR | 10-2006-0134100 A | 12/2006 |
| KR | 10-2007-0034001 A | 3/2007 |
| WO | WO 96/22356 | 7/1996 |
| WO | WO 2005/097483 A1 | 10/2005 |

* cited by examiner

FIG. 1

FIG. 2
Example 1

TABLE 1

| Prep. Ex. No. | First Fluorine Cmpd. ($R^f=2(a)$) | | | Second Fluorine Cmpd. ($R^f=2(e)$) | | | | | Reactive Silicon Cmpd. | | | | (Meth)acrylate Cmpd.[n1] |
|---|---|---|---|---|---|---|---|---|---|---|---|---|---|
| | $R^1$ | $R^{f1}$ | Amount[n2] | $R^1$ | $R^{f1}$ | $R^{f2}, R^{f3}, R^{f4}, R^{f5}$ | Amount | Formula | X Groups[n3] | R Groups[n3] | Amount | Amount |
| 1 | H | $(CF_2)_8$ | 0 | H | $(CF_2)_8$ | $CF_3$ | 90 | 5 | Methyl | Mercapto | 3 | 7 |
| 2 | H | $(CF_2)_8$ | 83 | H | $(CF_2)_8$ | $CF_3$ | 0 | 5 | Methyl | Mercapto | 10 | 7 |
| 3 | H | $(CF_2)_8$ | 30 | H | $(CF_2)_8$ | $CF_3$ | 60 | 6 | Methyl | Mercapto | 3 | 7 |
| 4 | H | $(CF_2)_8$ | 45 | H | $(CF_2)_8$ | $CF_3$ | 45 | 6 | Methyl | Epoxy | 3 | 7 |
| 5 | H | $(CF_2)_8$ | 45 | H | $(CF_2)_8$ | $CF_3$ | 45 | 6 | Methyl | Acrylate | 3 | 7 |
| 6 | H | $(CF_2)_8$ | 45 | H | $(CF_2)_8$ | $CF_3$ | 45 | 6 | Methyl | Epoxy | 3 | 7 |

| | Fluorine Cmpd. of Form. 3 | | | | | | Reactive Silicon Cmpd. | | | | (Meth)acrylate Cmpd.[n1] |
|---|---|---|---|---|---|---|---|---|---|---|---|
| | First Fluorine Cmpd. | | | | | | | | | | |
| | $R^1$ | $R^{f1}$ | Amount | A | R | a | Amount | Formula | X Groups | R Groups | Amount | Amount |
| 7 | H | $(CF_2)_8$ | 70 | $C(CH_2)_4$ | H | 3 | 20 | 5 | Methyl | Mercapto | 3 | 7 |
| 8 | H | $(CF_2)_8$ | 80 | $C(CH_2)_4$ | H | 3 | 10 | 5 | Methyl | Mercapto | 2 | 8 |
| 9 | H | $(CF_2)_8$ | 53 | $C(CH_2)_4$ | H | 3 | 40 | 5 | Methyl | Mercapto | 2 | 5 |
| 10 | H | $(CF_2)_8$ | 80 | $C(CH_2)_4$ | H | 3 | 10 | 5 | Methyl | Methacrylate | 3 | 7 |
| 11 | H | $(CF_2)_8$ | 80 | $C(CH_2)_4$ | H | 3 | 10 | 5 | Methyl | Epoxy | 3 | 7 |
| 12 | H | $(CF_2)_8$ | 80 | $C(CH_2)_4$ | H | 3 | 10 | 6 | Methyl | Epoxy | 3 | 7 |
| 13 | H | $(CF_2)_8$ | 38 | $C(CH_2)_4$ | H | 3 | 10 | 5 | Methyl | Mercapto | 3 | 50 |
| 14 | H | $(CF_2)_8$ | 70 | $C(CH_2)_4$ | H | 3 | 10 | 5 | Methyl | Mercapto | 10 | 10 |
| 15 | H | $(CF_2)_8$ | 80 | $C(CH_2)_4$ | H | 3 | 10 | 5 | Methyl | Mercapto | 0 | 10 |
| 16 | H | $(CF_2)_8$ | 76 | $C(CH_2)_4$ | H | 3 | 20 | 5 | Methyl | Mercapto | 3 | 2 |
| 17 | H | $(CF_2)_8$ | 28 | $C(CH_2)_4$ | H | 3 | 60 | 5 | Methyl | Mercapto | 2 | 10 |
| 18 | H | $(CF_2)_8$ | 88 | $C(CH_2)_4$ | H | 3 | 0 | 5 | Methyl | Mercapto | 2 | 10 |

Notes:

n1) EB5129 in each of Prep. Ex. Nos. 1-18.

n2) Herein, all amounts are parts by weight, based on 100 parts by weight of the total weight of the combination of: the fluorine compound(s), the reactive silicon compound, and the (meth)acrylate compound.

n3) In Formula 5: $X^1$, $X^2$, $X^3$ are each the same group listed in the "X Groups" column, and $R^3$, $R^4$ are each the same group listed in the "R Groups" column. In Formula 6: $X^4$ and $X^5$ are each the same group listed in the "X Groups" column, and $R^5$ and $R^6$ are each the same group listed in the "R Groups" column.

FIG. 5

TABLE 2

| No. | Outer Appear. | Average Reflect. (%) | Minimum Reflect. (%) | Transmit. (%) | Haze (%) | Steel Wool Test | Oil Pen Test | Contact Angle (°) |
|---|---|---|---|---|---|---|---|---|
| Ex. 1 | ○ | 2.48 | 0.73 | 92.5 | 0.98 | 5 | ○ | 99.7 |
| Ex. 2 | △ | 2.54 | 0.85 | 92.7 | 0.78 | 5 | ○ | 100.2 |
| Ex. 3 | ○ | 2.45 | 0.81 | 92.1 | 0.97 | 5 | ○ | 99.6 |
| Ex. 4 | ○ | 2.24 | 0.66 | 93.0 | 0.93 | 5 | ○ | 103.4 |
| Ex. 5 | ○ | 2.37 | 0.81 | 93.5 | 0.59 | 5 | △ | 96.4 |
| Ex. 6 | ○ | 2.42 | 0.83 | 92.8 | 0.62 | 5 | ○ | 100.5 |
| Ex. 7 | ○ | 2.01 | 0.6 | 92.3 | 0.95 | 5 | ○ | 103.4 |
| Ex. 8 | ○ | 2.21 | 0.6 | 92.9 | 0.81 | 5 | ○ | 104.6 |
| Ex. 9 | ○ | 2.24 | 0.6 | 93.2 | 0.84 | 5 | ○ | 98.6 |
| Ex. 10 | ○ | 2.54 | 0.8 | 92.8 | 0.95 | 5 | △ | 90.0 |
| Ex. 11 | ○ | 2.48 | 0.8 | 92.6 | 0.94 | 5 | ○ | 97.6 |
| Ex. 12 | ○ | 2.56 | 0.8 | 92.2 | 0.91 | 5 | ○ | 98.2 |
| C. Ex. 1 | ○ | 2.44 | 1.1 | 91.8 | 0.75 | 5 | ○ | 101.3 |
| C. Ex. 2 | X | 2.76 | 2.3 | 91.1 | 1.25 | 4 | ○ | 92.9 |
| C. Ex. 3 | ○ | 2.20 | 0.8 | 92.3 | 0.99 | 5 | X | 85.6 |
| C. Ex. 4 | ○ | 2.85 | 1.8 | 91.5 | 0.96 | 4 | ○ | 101.0 |
| C. Ex. 5 | ○ | 2.00 | 1.2 | 94.3 | 1.11 | 5 | ○ | 96.4 |
| C. Ex. 6 | X | 2.36 | 0.9 | 92.7 | 0.59 | 5 | ○ | 101.6 |

COATING COMPOSITION FOR FORMING LOW-REFRACTIVE-INDEX LAYER, ANTIREFLECTIVE FILM USING THE SAME, AND IMAGE DISPLAY DEVICE INCLUDING THE ANTIREFLECTIVE FILM

This application is a continuation of pending International Application No. PCT/KR2006/005615, entitled "Coating Composition for Low Refractive Layer, Anti-Reflection Film Using the Same and Image Displaying Device Comprising Said Anti-Reflection Film," which was filed on Dec. 21, 2006.

BACKGROUND OF THE INVENTION

1. Field of the Invention

Embodiments relate, generally, to a coating composition for forming a low-refractive-index layer, an antireflective film using the same, and an image display device including the antireflective film, and more particularly, to a coating composition for forming a low-refractive-index layer, which includes a fluorine compound, a reactive silicon compound, a (meth)acrylate compound, a polymerization initiator, and a solvent, to an antireflective film using the same, and to an image display device including the antireflective film.

2. Description of the Related Art

Typically represented by LCDs (Liquid Crystal Displays), PDPs (Plasma Display Panels), CRTs (Cathode Ray Tubes) or ELDs (ElectroLuminescent Displays), the use of display devices is popular these days.

There is a need for a display device having wear resistance and an antifouling property on the surface thereof, and furthermore, preventing the reflection of external light, such as solar light or fluorescent light, from the surface thereof upon use outdoors and under bright illumination. In addition, there is a need for a coating that can be formed using inexpensive operations such as polymer coating rather than, e.g., evaporative deposition. In the case of forming a polymer coating, there is also a need for a coating composition soluble in general solvents rather than, e.g., expensive fluorinated solvents. Further, there is a need for such a coating composition that maintains a suitably low refractive index and antifouling properties, and preferably provides a hard surface that is scratch resistant. Ideally, such a composition will also be stable when stored for a long time.

SUMMARY OF THE INVENTION

Embodiments are therefore directed to a coating composition for forming a low-refractive-index layer, an antireflective film using the same, and an image display device including the antireflective film, which substantially overcome one or more of the problems due to the limitations and disadvantages of the related art.

It is therefore a feature of an embodiment to provide a coating composition, suitable for forming a low-refractive-index layer, which can be dissolved in general solvents and forms a film having superior antifouling property and hardness without a decrease in antireflective performance.

It is therefore another feature of an embodiment to provide an image display device including the antireflective film.

At least one of the above and other features and advantages may be realized by providing a coating composition for forming a low-refractive-index layer, the composition including a first fluorine compound represented by Formula 1 below, $$(CH_2\!=\!CR^1COO)_2R^f \qquad \text{Formula 1}$$

and a reactive silicon compound, a (meth)acrylate compound, a polymerization initiator, and a solvent. The first fluorine compound represented by Formula 1, the reactive silicon compound, the (meth)acrylate compound, the polymerization initiator, and the solvent may each be different from one another, and in Formula 1, $R^f$ may be a $C_{1-19}$ perfluoro group, and $R^1$ may be a hydrogen atom or a methyl group.

The $R^f$ in Formula 1 may be a moiety represented by one of Formulae 2(a)-(e) below:

Formulae 2(a)-(e):

In Formulae 2(a)-(e), $R^{f1}$ may be a linear $C_{1-10}$ perfluoro group, and $R^{f2}$, $R^{f3}$, $R^{f4}$, and $R^{f5}$ may each independently be a linear $C_{1-14}$ perfluoro group.

The composition may further include at least one additional fluorine compound represented by Formula 1. The at least one additional fluorine compound represented by Formula 1 may be different from the first fluorine compound, the at least one additional fluorine compound represented by Formula 1 may include a second fluorine compound represented by Formula 1, and in the first fluorine compound and the second fluorine compound, each $R^f$ may independently be a moiety represented by one of Formulae 2(a)-(e).

The first fluorine compound and the second fluorine compound may each be used in an amount of about 10 or more parts by weight, based on 100 parts by weight of a total weight of the first fluorine compound and the at least one additional fluorine compound represented by Formula 1.

The composition may further include at least one additional fluorine compound represented by Formula 3 below:

$$R^f\!-\!O\!-\!A\!-\![O\!-\!CO\!-\!CR^2\!=\!CH_2]_a \qquad \text{Formula 3}$$

In Formula 3, $R^f$ may be a $C_{1-18}$ perfluoro group, A may be a dehydrated polyhydric alcohol residue, $R^2$ may be a hydrogen atom or a methyl group, and a may be an integer from 1 to 3.

The fluorine compound represented by Formula 1 may be present in an amount of about 50 to about 80 parts by weight, based on 100 parts by weight of a total solid content of the composition, and the at least one additional fluorine compound represented by Formula 3 may include a third fluorine compound represented by Formula 3, the third fluorine compound being present in an amount of about 5 to about 40 parts by weight, based on 100 parts by weight of a total solid content of the composition.

The (meth)acrylate compound may be present in an amount of about 3 to about 10 parts by weight, based on 100 parts by weight of a total weight of the first fluorine compound represented by Formula 1 and the (meth)acrylate compound.

The first fluorine compound may be present in an amount of about 70 to about 95 parts by weight, based on 100 parts by weight of a total solid content of the composition, the reactive silicon compound may be present in an amount of about 0.1 to about 15 parts by weight, based on 100 parts by weight of the total solid content of the composition, the (meth)acrylate compound may be present in an amount of about 1 to about 20 parts by weight, based on 100 parts by weight of the total solid content of the composition, and the polymerization initiator may be present in an amount of about 0.1 to about 10 parts by weight, based on 100 parts by weight of the total solid content of the composition.

The total solid content of the composition may be the total weight of the first fluorine compound represented by Formula 1, the reactive silicon compound, the (meth)acrylate compound, and the polymerization initiator in the composition, and the total solid content may be about 1 to about 20 parts by weight, based on 100 parts by weight of a total weight of the composition.

The reactive silicon compound may be present in an amount of about 0.2 to about 10 parts by weight, based on 100 parts by weight of a total solid content of the composition.

The reactive silicon compound may be represented by Formula 5 below:

Formula 5:

In Formula 5, $X^1$, $X^2$, and $X^3$ may each be hydrogen or a methyl group, $X^1$, $X^2$, and $X^3$ may be the same as or different from each other, at least one of $R^3$ and $R^4$ may be a curable reactive group, $R^3$ and $R^4$ may be the same as or different from each other, and b may be an integer from 3 to 1000.

The reactive silicon compound may be represented by Formula 6 below:

Formula 6:

In Formula 6, $X^4$ and $X^5$ may each be hydrogen or a methyl group, $X^4$ and $X^5$ may be the same as or different from each other, at least one of $R^5$ and $R^6$ may be a curable reactive group, $R^5$ and $R^6$ may be the same as or different from each other, and c may be an integer from 3 to 1,000.

The composition may further include colloidal silica modified by a fluorine silane coupling agent.

At least one of the above and other features and advantages may also be realized by providing an antireflective film, including a substrate, a hard coating layer, a high-refractive-index layer, and a low-refractive-index layer. The low-refractive-index layer may be formed using the composition according to an embodiment.

The antireflective film may have an average reflectance of less than about 3% in a visible light range of 380 to 780 nm.

The antireflective film may have a minimum reflectance of less than about 1% in a light wavelength range of 550 to 650 nm.

At least one of the above and other features and advantages may also be realized by providing an image display device, including the antireflective film according to an embodiment.

At least one of the above and other features and advantages may also be realized by providing an antireflective film, including a substrate, a hard coating layer, a high-refractive-index layer, and a low-refractive-index layer. The low-refractive-index layer may includes a polymeric film of a first fluorine compound represented by Formula 1 below, Formula 1 and a reactive silicon compound and a (meth)acrylate compound. The first fluorine compound represented by Formula 1, the reactive silicon compound, and the (meth)acrylate compound may each be different from one another, and in Formula 1, $R^f$ may be a $C_{1-19}$ perfluoro group, and $R^1$ may be a hydrogen atom or a methyl group.

At least one of the above and other features and advantages may also be realized by providing an image display device, including the antireflective film according to an embodiment.

BRIEF DESCRIPTION OF THE DRAWINGS

FIG. 4 illustrates Table 1 listing components of Preparative Examples 1 through 18.

DETAILED DESCRIPTION OF THE INVENTION

Korean Patent Application No. 10-2006-0100262, filed on Oct. 16, 2006, in the Korean Intellectual Property Office, and entitled: "Coating Composition for Forming Low-Refractive-Index Layer, Antireflective Film Using the Same, and Image Display Device Comprising the Antireflective Film," and Korean Patent Application No. 10-2006-0108903, filed on Nov. 6, 2006, in the Korean Intellectual Property Office, and entitled: "Coating Composition for Anti-Reflection Film, Anti-Reflection Film Using the Same and Image Displaying Device Comprising said Anti-Reflection Film," are incorporated by reference herein in their entireties.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a solvent" may represent a single compound, e.g., methyl alcohol, or multiple compounds in combination, e.g., methyl alcohol mixed with methylethyl ketone.

As used herein, molecular weights of polymeric materials are weight average molecular weights, unless otherwise indicated. Additionally, parts by weight of individual components are defined with respect to 100 parts by weight of a total reference weight, i.e., the total reference weight is 100 parts by weight. As used herein, the term "(meth)acrylate" refers to both acrylate and methacrylate. Thus, for example, the term ethyl (meth)acrylate refers to both ethyl acrylate and ethyl methacrylate. Further, the term "acrylate" is generic to both acrylate and methacrylate, unless specified otherwise. Thus, ethyl acrylate and ethyl methacrylate are both acrylates.

Hereinafter, a detailed description will be given of embodiments of the present invention.

A first embodiment relates to a coating composition for forming a low-refractive-index layer, the coating composition including a fluorine compound, e.g., a diacrylate, represented by Formula 1.

$$(CH_2=CR^1COO)_2R^f \qquad \text{Formula 1}$$

In Formula 1, $R^f$ is a perfluoro group. In Formula 1, $R^1$ is a hydrogen atom or a methyl group.

In the fluorine compound of Formula 1, $R^f$ may have a molecular structure as represented by Formulae 2(a) through 2(e).

Formulae 2(a)-(e):

In Formulae 2(a)-(e), $R^{f1}$ is a linear $C_{1-10}$ perfluoro group, and $R^{f2}$, $R^{f3}$, $R^{f4}$, and $R^{f5}$ are each a linear $C_{1-14}$ perfluoro group.

In order to be useful as resin for forming a film, the fluorine compound of Formula 1 should preferably have easy synthesis, low refractive property, easy UV curability, and a molecular structure and a molecular weight suitable for forming a coating layer.

The amount of the fluorine compound of Formula 1 is preferably about 70 to about 95 parts by weight, based on 100 parts by weight of the total solid content of the coating composition. If the amount is less than about 70 parts by weight, antireflective performance may be insufficient. If the amount exceeds about 95 parts by weight, the hardness and scratch resistance of the coating film may become poor.

According to a second embodiment, in order to impart the fluorine compound with both a low refractive property and easy UV curability, which are generally contrary to each other, among the compounds of Formula 1, two or more fluorine compounds that are different from each other and are able to respectively exhibit the corresponding properties may be mixed together depending on need. In this case, each of the two or more different fluorine compounds of Formula 1 is preferably used in an amount of about 10 or more parts by weight, based on 100 parts by weight of the total weight of the fluorine compounds. If the respective fluorine compounds are used in an amount less than about 10 parts by weight, properties that are expected to be realized by mixing them may not be realized.

According to a third embodiment, a coating composition for forming a low-refractive-index layer may include two or more fluorine compounds different from each other. In an implementation, the two or more fluorine compounds differ- ent from each other may include a first fluorine compound represented by Formula 1 and a second fluorine compound represented by Formula 3.

Formula 3

In Formula 3, $R^f$ is a $C_{1-18}$ perfluoro group, A is a dehydrated polyhydric alcohol residue, R is a hydrogen atom or a methyl group, and a is an integer from 1 to 3. In the case that $R^f$ is a linear $C_{1-18}$ perfluoro group, $R_f$ may be represented by $C_{1-18}F_{3-37}$, i.e., F=2C+1. The amount of the fluorine compound of Formula 3 may be about 5 to about 40 parts by weight, based on 100 parts by weight of the total solid content of the composition.

In the fluorine compound of Formula 3 in the third embodiment, the perfluoro group, $R^f$, may be either linear or branched, or may have a cyclic ring in the molecular structure thereof. Among these examples of fluorine compounds of Formula 3, particularly useful is perfluorononene, represented by Formula 4.

Formula 4:

In the fluorine compound of Formula 4, the dehydrated polyhydric alcohol residue, -A-, may be obtained through a reaction of polyhydric alcohol represented by $(HO-)_p$-A-$(-OH)_q$, where p and q are each zero or a positive integer, and p+q is 1 or more. The polyhydric alcohol may be, e.g., pentaerythritol, dipentaerythritol, tripentaerythritol, glycerine, diglycerine, triglycerine, polyglycerine, trimethylol propane, ditrimethylol propane, and trimethylol ethane, ethyleneoxide adducts thereof, propylene oxide adducts thereof, butylenes oxide adducts thereof, or ε-caprolactone modifications thereof. The fluorine compound of Formula 3 may have one or more (meth)acrylate groups at the terminal end thereof. Thus, it may contribute to an increase in hardness and scratch resistance of a coating film through reaction with another component upon a curing process.

The amount of the fluorine compound of Formula 4 is preferably about 5 to about 40 parts by weight, based on 100 parts by weight of the total weight of the solid content of the composition. If the amount is less than about 5 parts by weight, the hardness and scratch resistance of the coating film may become insufficient. If the amount exceeds about 40 parts by weight, antireflective performance may be deteriorated.

Reactive Silicon Compound

In the coating composition for forming a low-refractive-index layer according to an embodiment, the reactive silicon compound may be, e.g., a silicone (silicon-oxygen backbone)-type compound, represented by Formula 5 or Formula 6.

Formula 5:

In Formula 5, $X^1$, $X^2$, and $X^3$, which are the same as or different from each other, are each hydrogen or a methyl group. In Formula 5, at least one of $R^3$ and $R^4$, which are the same as or different from each other, is a curable reactive group. In Formula 5, b is an integer from 3 to 1000.

Formula 6:

In Formula 6, $X^4$ and $X^5$, which are the same as or different from each other, are each hydrogen or a methyl group. In Formula 6, at least one of $R^5$ and $R^6$, which are the same as or different from each other, is a curable reactive group. In Formula 6, c is an integer from 3 to 1000.

The reactive silicon compound may be a compound in which at least one functional group as the curable reactive group is contained in the terminal end of (e.g., Formula 5), or in the molecule of a basic structure of (e.g., Formula 6), a compound such as polysiloxane, methylhydropolysiloxane, trimethyl siloxane methylhydro siloxane copolymer, dimethyl siloxane methylhydro siloxane copolymer, and polydimethylsiloxane, which may be in the form of an oil. The reactive silicon compound may be used alone or in mixtures of two or more. The process of preparing the reactive silicon compound may vary depending on the type of curable reactive group contained in the terminal end thereof.

Examples of the curable reactive group contained in the reactive silicon compound include an amino group, an epoxy group, an alicyclic epoxy group, a carbonyl group, a methacrylate group, a polyethyl group, a mercapto group, a carboxyl group, a phenol group, and a hydroxyl group.

The reactive silicon compound may be used in an amount of about 0.1 to about 15 parts by weight, and preferably about 0.2 to about 10 parts by weight, based on 100 parts by weight of the total solid content of the composition. If the amount is less than about 0.1 parts by weight, the antifouling property of the coating film may be insufficient. On the other hand, if the amount exceeds about 15 parts by weight, the outer appearance of the coating film may become poor and a phenomenon of whiteness may occur.

(Meth)Acrylate Compound

The (meth)acrylate compound may be a monomer, an oligomer, or a polymer having a polymerizable unsaturated bond, such as a methacryloyl group or a methacryloyloxy group, or a cationic polymerizable functional group, such as an epoxy group, in the molecule thereof.

The (meth)acrylate compound is preferably used in an amount of about 1 to about 20 parts by weight, based on 100 parts by weight of the total solid content of the composition. If the amount is less than about 1 part by weight, the curing efficiency of the coating layer may not be sufficiently high, or the outer appearance of the coating film may be non-uniform.

On the other hand, if the amount exceeds about 20 parts by weight, antireflective performance may be deteriorated. In an implementation, the (meth)acrylate compound may be used in an amount of about 3 to about 10 parts by weight, based on 100 parts by weight of the total weight of, i.e., the sum of the weights of, the fluorine compound represented by Formula 1 and the (meth)acrylate compound.

Polymerization Initiator

The polymerization initiator may include, e.g., a photoinitiator and/or a radical initiator. A polymerization initiator that is not susceptible to oxygen inhibition but has good initiation efficiency may be particularly useful.

The polymerization initiator may be used in an amount of about 0.1 to about 10 parts by weight, and preferably about 0.5 to about 5 parts by weight, based on 100 parts by weight of the total solid content of the composition. If the amount is less than about 0.1 parts by weight, the hardness of the prepared coating film may be low. If the amount exceeds about 10 parts by weight, the polymerization initiator itself may react with a radical, undesirably inhibiting the polymerization.

Other Parameters

The solid content, composed of the fluorine compound of Formula 1, the reactive silicon compound, the (meth)acrylate compound, and the polymerization initiator, is preferably about 1 to about 20 parts by weight, based on 100 parts by weight of the total weight of the composition. Solvent may be added to adjust the ratio of solid content to total weight. If the solid content is less than about 1 part by weight, the coating layer may be too thin, and thus antireflective performance may not be manifested. If the solid content exceeds about 20 parts by weight, the wavelength range showing a minimum reflectance value may fall outside of the visible light range.

Solvent

The solvent may include, e.g., an alcohol, such as methyl alcohol, ethyl alcohol, propanol, isopropanol, or 1-methoxy-2-propanol, a ketone, such as methyl isobutyl ketone or methylethyl ketone, an ester, such as methyl acetate or ethyl acetate, an aromatic compound, such as toluene, xylene, or benzene, and an ether, such as diethyl ether, which may be used alone or in mixtures of two or more.

Further, in order to increase scratch resistance and the antifouling property of the coating film, colloidal silica, which may be modified by a fluorine silane coupling agent, may be additionally included in the composition.

An embodiment relates to an antireflective film, which includes a substrate, a hard coating layer, a high-refractive-index layer, and a low-refractive-index layer, the low-refractive-index layer being formed using the coating composition according to embodiments described above. The substrate may have such layers stacked in sequence thereon.

Figure 1:
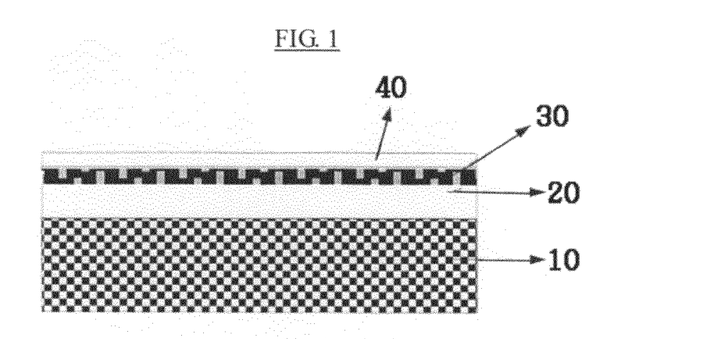
FIG. 1 illustrates a schematic sectional view of an antireflective film according to an embodiment.

Below, the antireflective film according to an embodiment is specifically described with reference to the appended drawing thereof.

FIG. 1 illustrates a schematic sectional view of an antireflective film according to an embodiment, including a substrate 10, a hard coating layer 20 for conferring scratch resistance, a high-refractive-index layer 30 for conferring antireflective performance, and a low-refractive-index layer 40.

Substrate

The substrate 10 of the antireflective film according to an embodiment is preferably a transparent plastic film, which may provide ease of processability. Examples of material for the substrate include cellulose ester, such as acetylcellulose, diacetylcellulose, propionylcellulose, acetylpropionylcellulose, or nitrocellulose, polyester, such as polyethylene terephthalate, polybutylene terephthalate, polyethylene naphthalate, poly-1,4-cyclohexane dimethylene terephthalate, polyethylene-1,2-diphenoxyethane-4,4'-dicarboxylate, or cyclohexane dimethylene terephthalate, and polyolefin, such as polyethylene, polypropylene, or polymethylpentane. Additional examples include polymethylmethacrylate, polyvinyl chloride, polyvinylidene chloride, polyvinyl alcohol, polystyrene, polycarbonate, polyamide, polyethersulfone, polyetherketone, polysulfone, polyimide, and nylon. Among these, since acetylcellulose, polyethylene terephthalate, and polycarbonate are highly transparent, such materials may be particularly useful as the substrate 10 of the optical film. In addition, it is possible to use acetylcellulose which is saponified with alkali.

Hard Coating Layer

The antireflective film according to this embodiment may include the hard coating layer 20, positioned beneath the high-refractive-index layer 30, for increasing the hardness of the film. This hard coating layer 20 may serve to protect the substrate and increase the hardness of the film. The hard coating layer may be prepared using a coating composition including a UV curable resin, a photoinitiator, and a solvent, and also including inorganic particles depending on need.

Used in the hard coating layer, the UV curable resin preferably includes a compound having two or more functional groups. Such a compound is exemplified by, e.g., a monomer, an oligomer, or a polymer, which has a polymerizable unsaturated bond, such as a methacryloyl group or a methacryloyloxy group, or a cationic polymerizable functional group, such as an epoxy group, in the molecule thereof. The compound having two or more functional groups may be used alone or in mixtures of two or more.

Preferably, the UV curable resin has a reactive ethylene group in the molecule thereof to crosslink it upon a curing process.

The hard coating layer may further include inorganic particles, if necessary, in order to control the refractive index and/or to increase the hardness of the film. When used, the inorganic particles preferably have an average diameter of about 0.5 µm or less. If the average diameter of the inorganic particles exceeds about 0.5 µm, the haze of the antireflective film may be increased. Examples of the inorganic particles include silicon dioxide, titanium dioxide, aluminum oxide, tin oxide, calcium carbonate, barium sulfate, talc, kaolin, and calcium lactate particles.

The hard coating layer preferably has a thickness of about 0.5 to about 15 µm. If the thickness of the hard coating layer is less than about 0.5 µm, hardness may be insufficient. On the other hand, if the thickness exceeds about 15 µm, the film may easily curl and the transmittance thereof may be decreased.

The process of applying the hard coating layer is not particularly limited, and examples thereof include wet coating, such as roll coating, die coating, bar coating, spin coating, etc. After the coating process, the applied film may be dried at about 50° C. to about 130° C. to remove the solvent and then cured using UV light energy at about 100 to about 700 mJ/cm$^2$.

High-Refractive-Index Layer

The high-refractive-index layer 30 may be prepared using a coating composition including metal oxide particles having a high refractive index, a resin having two or more UV curable functional groups, a photoinitiator, and a solvent.

The metal oxide particles may include, e.g., zinc oxide, tin oxide, antimony tin oxide, indium tin oxide, indium oxide, antimony oxide, zirconium oxide, titanium oxide, tungsten oxide, zinc antimonate, and vanadium oxide. The metal oxide is preferably selected in consideration of dispersibility of the particles and in consideration of whether the refractive index is easily controlled.

The metal oxide particles may have an average diameter of about 0.01 to about 0.5 µm. If the average diameter is less than about 0.01 µm, it may be difficult to disperse the particles. On the other hand, if the average diameter exceeds about 0.5 µm, haze may be increased.

When the surface of the metal oxide particles is treated using a coupling agent, the dispersibility of the particles may be increased and the dispersion stability of a coating solution for forming a high-refractive-index layer may be increased. Examples of the coupling agent include isopropyl triisostearoyl titanate, titanium n-butoxide, titanium ethoxide, titanium 2-ethylhexyloxide, titanium isobutoxide, and titanium stearyloxide.

The resin having two or more UV curable functional groups, which may be the same type as the resin used in the hard coating layer, preferably includes a monomer, an oligomer or a polymer having a polymerizable unsaturated bond, such as a methacryloyl group or a methacryloyloxy group, or a cationic polymerizable functional group, such as an epoxy group, in the molecule thereof.

The process of applying the coating solution for forming the high-refractive-index layer is not particularly limited, and examples thereof include wet coating, such as roll coating, die coating, bar coating, spin coating, etc. After the coating process, the applied film may be dried at about 50 to about 130° C. to remove the solvent, and then cured using UV light at about 300 to about 1000 mJ/cm$^2$.

The high-refractive-index layer may be formed into a two-layer structure of a medium-refractive-index layer and a high-refractive-index layer, in that order, to control refractive index, depending on need. The refractive index may also be controlled depending on the amount of metal oxide particles.

In the case where the high-refractive-index layer is formed using the above coating solution, it may have a refractive index of about 1.6 or more, and preferably about 1.6 to about 2, and a thickness of about 60 to 600 nm. It may be necessary to finely control the thickness of the layer depending on the refractive index of the coating film, in order to exhibit antireflective performance using light interference among layers of the film.

Low-Refractive-Index Layer

The low-refractive-index layer 40 may be prepared using the above-described coating composition including the fluorine compound represented by Formula 1, the reactive silicon compound, the (meth)acrylate compound, the polymerization initiator, and the solvent. In addition, in order to enhance scratch resistance and antifouling property of the coating film, colloidal silica, which is modified by a fluorine silane coupling agent, may be further included, if necessary.

The process of applying the coating solution for forming the low-refractive-index layer is not particularly limited, and examples thereof include wet coating, such as roll coating, die coating, bar coating, spin coating, etc. After the coating process, the applied film may be dried at about 50 to about 130° C. to remove the solvent and then cured using UV light at about 300 to about 1300 mJ/cm$^2$.

The low-refractive-index layer thus formed may have a refractive index of about 1.3 to about 1.5. The thickness may be about 60 to 600 nm, like the thickness of the high-refractive-index layer. In the low-refractive-index coating solution according to embodiments using a fluorine-based monomer or oligomer, the refractive index thereof may be about 1.3 or more. If the refractive index exceeds about 1.5, antireflective performance may be relatively low. If the thickness of the low-refractive-index layer is less than about 60 nm, antireflective performance may be low or not present. If the thickness exceeds about 600 nm, the wavelength range where the minimum reflectance is obtained may fall outside of the visible light range.

According to embodiments, it is preferred that the difference in refractive index between the high-refractive-index layer and the low-refractive-index layer be 0.05 to about 0.7. When the difference in refractive index between the high-refractive-index layer and the low-refractive-index layer is less than 0.05, antireflective performance may become insufficient. On the other hand, when the difference in refractive index exceeds about 0.7, it may not be easy to realize sufficient antireflective performance using a wet coating process.

The antireflective film formed according to embodiments may exhibit a haze of about 1% or less, an average reflectance of about 3% or less in a visible light range, that is, in a wavelength range of about 380 to about 780 nm, a minimum reflectance less than about 1% in a light wavelength range of about 550 to about 650 nm, and a contact angle with respect to water of about 90° or more.

An embodiment relates to an image display device including an antireflective film.

The image display device including the antireflective film according to an embodiment may have low reflectance and high transmittance while sufficiently exhibiting an antifouling property and durability, and thus may be widely applied to PDPs, LCDs, touch panels, etc.

As described above, embodiments may provide a coating composition for forming a low-refractive-index layer, an antireflective film formed using the same, and an image display device including the antireflective film. The coating composition for forming a low-refractive-index layer according to embodiments may make it possible to manufacture an antireflective film having low reflectance and haze, and high antifouling property and scratch resistance, and an image display device including the film.

Preparative Examples 1 to 18

Preparation of Coating Solution for Forming Low-Refractive-Index Layer

For Preparative Examples 1 through 6, a first fluorine compound of Formula 1 having R$^f$ represented by Formula 2(a), and another fluorine compound of Formula 1 having R$^f$ represented by Formula 2(e) were used. For Preparative Examples 7 through 18, a first fluorine compound of Formula 1 and another fluorine compound of Formula 3 were used. Preparative Examples 1 through 12 were used to prepare Examples 1 through 12, respectively. Preparative Examples 13-18 were used to prepare Comparative Examples 1 through 6, respectively. In each of Preparative Examples 1 through 19, a (meth)acrylate compound exemplified by urethane acrylate oligomer (Ebecryl 5129, available from SK-UCB) and a reactive silicon compound were used, as shown in Table 1 in FIG. 4. Respective components were dissolved in a methylethylketone solvent and then mixed, after which the solid content of the composition was controlled to be 5 parts by weight using a solvent mixture of methyl ethylketone and methylisobutylketone. A photoinitiator, Irgacure 127 (available from Ciba-Geigy), was added in an amount of 5 parts by weight based on the total weight of the solid content of the composition, and then a stirring process was conducted to completely dissolve the components.

Examples 1 to 12

Manufacture of Antireflective Film

1) Substrate

As a substrate, a PET film (A4300, available from Toyobo) having a thickness of 100 µm was used.

2) Formation of Hard Coating Layer 30 parts by weight of urethane acrylate oligomer (Ebecryl 5129, available from SK-UCB) and 20 parts by weight of dipentaerythritol acrylate (A-400, available from Nippon Kayaku) were mixed with 25 parts by weight of each of methylethylketone and toluene as solvents. A photoinitiator, Irgacure 184 (available from Ciba-Geigy), was added in an amount of 1 part by weight based on the total weight of the solid content of the hard coating layer composition.

Using a #12 bar as a bar coater, a coating film was formed, dried at 80° C. for 2 min to thus remove the solvent, and then cured through irradiation of UV light at 300 mJ/cm².

3) Formation of High-Refractive-Index Layer

A dispersion of tin oxide (available from Catalysts & Chemicals Ind. Co. Ltd.), in which tin oxide particles having an average diameter of 25 nm were dispersed in a UV curable resin, ethanol and isopropanol, was diluted to 8 wt % using isopropanol.

Using a #4 bar as a bar coater, a coating film was formed, dried at 80° C. for 2 min to thus evaporate the solvent, and then cured through irradiation of UV light at 500 mJ/cm².

4) Formation of Low-Refractive-Index Layer

Each of the coating solutions for forming the low-refractive-index layer prepared in Preparative Examples 1 through 12 of Table 1 was applied using a #4 bar as a bar coater to thus form a coating film, which was then dried at 80° C. for 2 min to thus evaporate the solvent, thereby forming a coating film.

Figure 2:
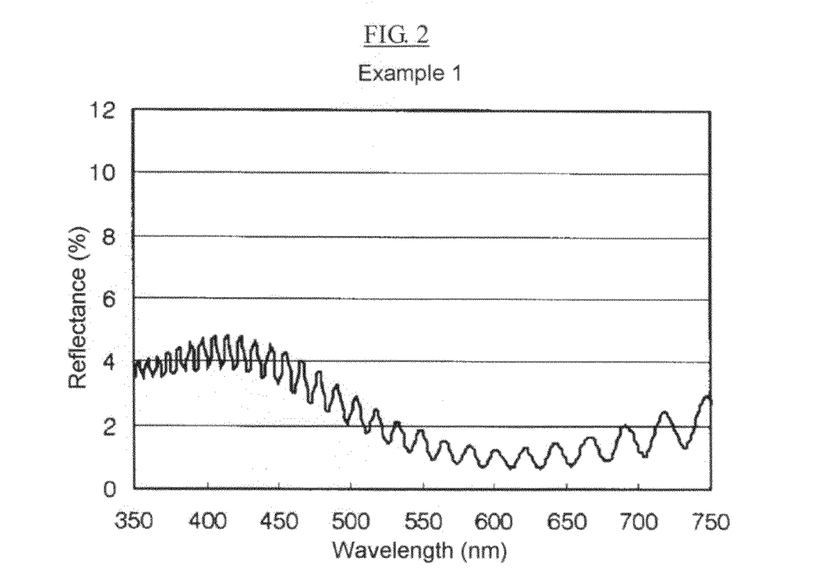
FIG. 2 illustrates a graph of a reflectance spectrum of an antireflective film obtained in Example 1 according to an embodiment.
Figure 3:
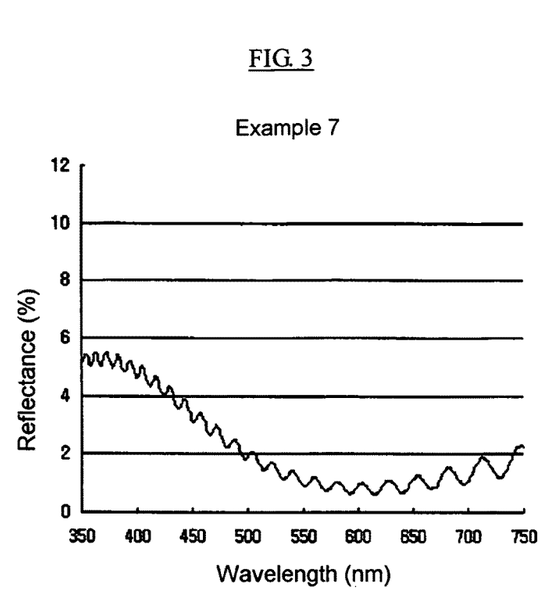
FIG. 3 illustrates a graph of a reflectance spectrum of an antireflective film obtained in Example 7 according to an embodiment.

The coating films thus formed were measured for average reflectance, transmittance, haze, and contact angle, and furthermore, were subjected to a steel wool test and an oil pen test. The results are shown in Table 2 in FIG. 5. In addition, the reflectance spectra of the antireflective films of Examples 1 and 7 are shown in FIGS. 2 and 3, respectively.

Comparative Examples 1 to 6

The Comparative Examples were prepared in the same manner as in Examples 1 through 12, with the exception that the low-refractive-index layer was formed using the coating composition of each of Preparative Examples 13 through 18, respectively, shown in Table 1. The results of measurement of the properties of the coating films thus formed are given in Table 2 in FIG. 5.

Methods of Evaluating Properties

Outer Appearance: The outer appearance of the antireflective film was observed with the naked eye. In Table 2, the case where a poor outer appearance of the coating film was not observed is indicated by O. In Table 2, the case where faint marks scratched by the bar remained thereon is indicated by Δ. In Table 2, the case where clear marks scratched by the bar remained thereon, or where the surface of the film was opaque is indicated by X.

Average Reflectance: The reflectance was of a surface of the film was measured using a UV/VIS/NIR spectrometer (Lambda 950, available from Perkin-Elmer). The opposite surface of the sample, i.e., the surface other than the surface under test, was rubbed with abrasive paper, and was then coated with flat paint (CL440F-1999, available from Koryo Paint) to thus eliminate reflective light from the opposite surface of the film. The incident angle was set at 8°, and the reflectance with respect to specular light among reflected light was measured. The measured reflectance values were averaged in the range of 380 nm to 780 nm.

Minimum Reflectance: The reflectance was measured using a UV/VIS/NIR spectrometer (Lambda 950, available from Perkin-Elmer). The opposite surface of the sample was rubbed with abrasive paper, and then coated with flat paint (CL440F-1999, available from Koryo Paint) to thus eliminate reflective light from the opposite surface of the film. The incident angle was set at 8°, and the reflectance with respect to specular light among reflected light was measured. Among the measured reflectance values in the range of 550 nm to 650 nm, the minimum reflectance value was recorded.

Haze: The haze was measured using a haze and turbidity meter (available from Nippon Denshoku Kogyo Co.).

Steel Wool Test: The coating film was scratched through reciprocal movements 20 times using #0000 steel wool under a load of 200 g. The degree of scratching was classified from 1 to 5. In Table 2, the case where the coating film was completely peeled off is represented by 1. In Table 2, the case where the tested coating film was not changed is represented by 5.

Oil Pen Test: The coating film was fouled using an oil pen (available from Monami), from which the fouling was then removed through reciprocal movements 5 times using cotton cloth. The case where the fouling was completely removed is represented by O, the case where the fouling was removed but traces thereof remained is represented by Δ, and the case where the fouling was not removed is represented by X.

Contact Angle: The contact angle with respect to water was measured using a contact angle analyzer (Phoenix300, available from SEQ).

Figure 5:
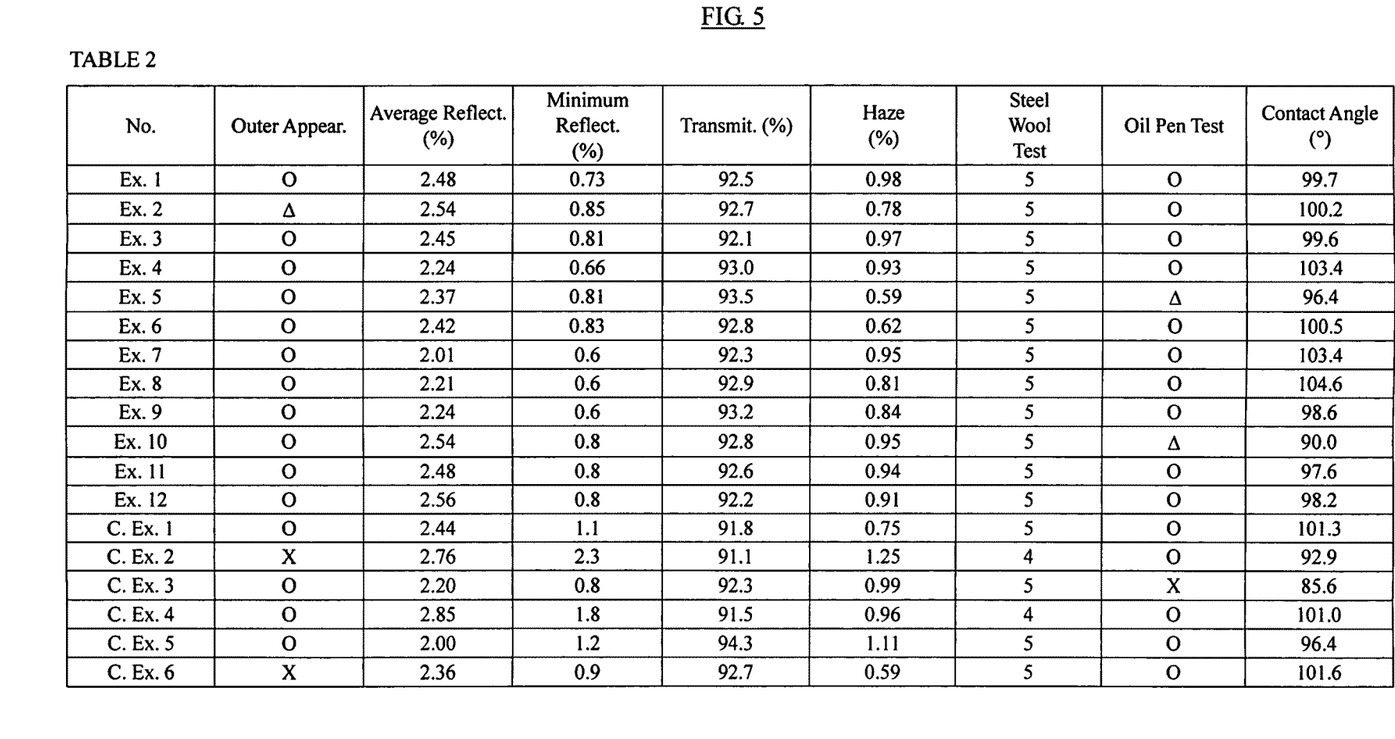
FIG. 5 illustrates Table 2 listing properties of Examples 1 through 12 and Comparative Examples 1 through 6.

As is apparent from Table 2, the antireflective films of Examples 1 to 12 according to embodiments had average reflectance of 3% or less and haze of 1% or less, and exhibited superior antifouling property and higher scratch resistance without a decrease in antireflective performance, compared to those of antireflective films of Comparative Examples 1 to 6.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A coating composition for forming a low-refractive-index layer, the composition comprising:

about 70 to about 95 parts by weight of a fluorine compound including a first fluorine compound represented by Formula 1 below;

about 0.1 to about 15 parts by weight of a reactive silicon compound;

about 1 to about 20 parts by weight of a (meth)acrylate compound;

about 0.1 to about 10 parts by weight of a polymerization initiator; and a solvent, wherein:

the first fluorine compound represented by Formula 1, the reactive silicon compound, the (meth)acrylate compound, the polymerization initiator, and the solvent are each different from one another, in Formula 1, $R^1$ is a hydrogen atom or a methyl group and the $R^f$ in Formula 1 is a moiety represented by one of Formulae 2(a)-(e) below:

Formulae 2(a)-(e):

in Formula 2(a)-(e), $R^{f1}$ is a linear $C_{1-10}$ perfluoro group, and $R^{f2}$, $R^{f3}$, $R^{f4}$, and $R^{f5}$ are each independently a linear $C_{1-14}$ perfluoro group, and all parts by weight are based on 100 parts by weight of a total solid content of the composition.

2. The composition as claimed in claim 1, wherein the fluorine compound further includes a second fluorine compound represented by Formula 1, wherein:
the second fluorine compound represented by Formula 1 is different from the first fluorine compound, and
in the first fluorine compound and the second fluorine compound, each $R^f$ is independently a moiety represented by one of Formulae 2(a)-(e).

3. The composition as claimed in claim 2, wherein the first fluorine compound and the second fluorine compound are each present in an amount of about 10 or more parts by weight, based on 100 parts by weight of a total weight of the first fluorine compound and the second fluorine compound represented by Formula 1.

4. The composition as claimed in claim 1, wherein the fluorine compound further includes a third fluorine compound represented by Formula 3 below:

$$R^f\text{—O-A}\text{—[O—CO—CR}^2\text{=CH}_2]_a \qquad \text{Formula 3}$$

wherein, in Formula 3, $R^f$ is a $C_{1-18}$ perfluoro group, A is a dehydrated polyhydric alcohol residue, $R^2$ is a hydrogen atom or a methyl group, and a is an integer from 1 to 3.

5. The composition as claimed in claim 4, wherein:
the first fluorine compound represented by Formula 1 is present in an amount of about 50 to about 80 parts by weight, based on 100 parts by weight of a total solid content of the composition, and
the third fluorine compound represented by Formula 3 is present in an amount of about 5 to about 40 parts by weight, based on 100 parts by weight of a total solid content of the composition.

6. The composition as claimed in claim 1, wherein the (meth)acrylate compound is present in an amount of about 3 to about 10 parts by weight, based on 100 parts by weight of a total weight of the first fluorine compound represented by Formula 1 and the (meth)acrylate compound.

7. The composition as claimed in claim 1, wherein:
the total solid content of the composition is the total weight of the fluorine compound, the reactive silicon compound, the (meth)acrylate compound, and the polymerization initiator in the composition, and
the total solid content is about 1 to about 20 parts by weight, based on 100 parts by weight of a total weight of the composition.

8. The composition as claimed in claim 1, wherein the reactive silicon compound is present in an amount of about 0.2 to about 10 parts by weight, based on 100 parts by weight of a total solid content of the composition.

9. The composition as claimed in claim 1, wherein:
the reactive silicon compound is represented by Formula 5 below:

Formula 5:

wherein, in Formula 5, $X^1$, $X^2$, and $X^3$ are each hydrogen or a methyl group, $X^1$, $X^2$, and $X^3$ are the same as or different from each other, at least one of $R^3$ and $R^4$ is a curable reactive group, $R^3$ and $R^4$ are the same as or different from each other, and b is an integer from 3 to 1000, or the reactive silicon compound is represented by Formula 6 below:

Formula 6:

wherein, in Formula 6, $X^4$ and $X^5$ are each hydrogen or a methyl group, $X^4$ and $X^5$ are the same as or different from each other, at least one of $R^5$ and $R^6$ is a curable reactive group, $R^5$ and $R^6$ are the same as or different from each other, and c is an integer from 3 to 1,000.

10. The composition as claimed in claim 1, further comprising colloidal silica modified by a fluorine silane coupling agent.

11. An antireflective film, comprising:
a substrate;
a hard coating layer;
a high-refractive-index layer; and
a low-refractive-index layer, wherein:
the low-refractive-index layer is formed using the composition as claimed in claim 1.

12. The antireflective film as claimed in claim 11, wherein the antireflective film has an average reflectance of less than about 3% in a visible light range of 380 to 780 nm.

13. The antireflective film as claimed in claim 11, wherein the antireflective film has a minimum reflectance of less than about 1% in a light wavelength range of 550 to 650 nm.

14. An image display device, comprising the antireflective film as claimed in claim 11.

15. A coating composition for forming a low-refractive-index layer, the composition comprising:

a first fluorine compound represented by Formula 1 below;

$(CH_2=CR^1COO)_2R^f$  Formula 1 a second fluorine compound represented by Formula 1;

a reactive silicon compound;

a (meth)acrylate compound;

a polymerization initiator; and a solvent, wherein:

the first fluorine compound represented by Formula 1, the second fluorine compound, the reactive silicon compound, the (meth)acrylate compound, the polymerization initiator, and the solvent are each different from one another, in the first fluorine compound and the second fluorine compound represented by Formula 1, $R^1$ is a hydrogen atom or a methyl group and the $R^f$ in Formula 1 is a moiety represented by one of Formulae 2(a)-(e) below:

Formulae 2(a) - (e):

(a)

(b)

(c)

(d)

(e)

in Formula 2(a)-(e), $R^{f1}$ is a linear $C_{1-10}$ perfluoro group, and $R^{f2}$, $R^{f3}$, $R^{f4}$, and $R^{f5}$ are each independently a linear $C_{1-14}$ perfluoro group.

* * * * *